United States Patent
Sekine et al.

(10) Patent No.: US 11,897,482 B2
(45) Date of Patent: Feb. 13, 2024

(54) AUTONOMOUS VEHICLE CONTROL FOR CHANGING GRIP COMPLETION STATUS IN REAL-TIME TO PREVENT UNNECESSARY WARNING ISSUANCE

(71) Applicant: TOYOTA JIDOSHA KABUSHIKI KAISHA, Toyota (JP)

(72) Inventors: Kiyotoshi Sekine, Kakamigahara (JP); Takahiko Kuwabara, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 110 days.

(21) Appl. No.: 17/366,926

(22) Filed: Jul. 2, 2021

(65) Prior Publication Data

US 2022/0024462 A1    Jan. 27, 2022

(30) Foreign Application Priority Data

Jul. 21, 2020    (JP) ................................. 2020-124362

(51) Int. Cl.
*B60W 40/09*    (2012.01)
*B60W 30/18*    (2012.01)
*B60W 40/08*    (2012.01)

(52) U.S. Cl.
CPC ...... *B60W 40/09* (2013.01); *B60W 30/18109* (2013.01); *B60W 2040/0872* (2013.01); *B60W 2540/229* (2020.02)

(58) Field of Classification Search
CPC ........... B60W 40/09; B60W 2540/229; B60W 30/18109; B60W 2040/0872
See application file for complete search history.

(56) References Cited

U.S. PATENT DOCUMENTS

| | | | |
|---|---|---|---|
| 2016/0039428 A1* | 2/2016 | Odate | G05D 1/0061 701/23 |
| 2017/0166237 A1* | 6/2017 | Oh | B62D 15/029 |
| 2018/0203444 A1* | 7/2018 | Matsumura | B60W 50/10 |
| 2020/0089226 A1* | 3/2020 | Breisinger | B62D 1/06 |
| 2020/0189655 A1* | 6/2020 | Ahn | B62D 1/046 |
| 2020/0307453 A1* | 10/2020 | Kim | B62D 15/025 |
| 2021/0114660 A1* | 4/2021 | Yamashita | B62D 1/06 |
| 2022/0004788 A1* | 1/2022 | Tang | G06V 20/597 |

FOREIGN PATENT DOCUMENTS

| | | |
|---|---|---|
| JP | 2016-038846 A | 3/2016 |
| JP | 2018-116429 A | 7/2018 |

* cited by examiner

*Primary Examiner* — Jess Whittington
*Assistant Examiner* — Rami Nabih Bedewi
(74) *Attorney, Agent, or Firm* — Oliff PLC

(57) ABSTRACT

A control device for a vehicle is configured to request that a driver grip a steering wheel at the time of a predetermined driving scene, judge whether a steering wheel grip status is a one-handed grip status or a two-handed grip status, and judge based on the steering wheel grip status whether the status is a grip completion status where the steering wheel has finished being gripped. The control device is further configured to change whether to judge the status is a grip completion status if at least a one-handed grip status or to judge whether the status is a grip completion status only if a two-handed grip status in accordance with the driving scene.

9 Claims, 3 Drawing Sheets

AUTONOMOUS VEHICLE CONTROL FOR CHANGING GRIP COMPLETION STATUS IN REAL-TIME TO PREVENT UNNECESSARY WARNING ISSUANCE

FIELD

The present disclosure relates to a control device for a vehicle, a control method for an automated driven vehicle, and a nontransitory recording medium provided with a computer program.

BACKGROUND

Japanese Unexamined Patent Publication No. 2018-116429 discloses a conventional control device of a vehicle provided with a steering wheel grip status judging part judging based on input information from a driver on the steering wheel whether the steering wheel grip status of the driver is a non-grip status, a first grip status including a status where the driver hands contact the steering wheel without gripping the steering wheel, or a second grip status where the degree of the grip is stronger than the first grip status.

SUMMARY

In automated driving, in a predetermined driving scene, the driver is sometimes requested to grip the steering wheel. In such a driving scene, it is not necessarily required that he or she grip the steering wheel by both hands. Sometimes safety during automated driving can be secured if gripping it by one hand. Therefore, in such a case, requiring the steering wheel be gripped by both hands is liable to detract from the convenience of automated driving.

The present disclosure was made in consideration of such a problem and has as its object to secure safety in automated driving without detracting from the convenience of automated driving.

To solve this problem, a control device for a vehicle according to one aspect of the present disclosure is provided with processor being configured to perform automated driving for automatically performing a driving operation of the vehicle, request that a driver grip a steering wheel at the time of a predetermined driving scene, judge based on input information from the driver on the steering wheel whether a steering wheel grip status is a one-handed grip status or a two-handed grip status, and judge based on the steering wheel grip status when gripping the steering wheel is requested whether the status is a grip completion status where the steering wheel has finished being gripped. The processor is further configured to change whether to judge the status is a grip completion status if at least a one-handed grip status or to judge whether the status is a grip completion status if a two-handed grip status in accordance with the driving scene.

Further, a control method for an automated driven vehicle according to one aspect of the present disclosure comprises a grip request step requesting a driver grip a steering wheel at the time of a predetermined driving scene, a grip status judging step judging based on input information from the driver on the steering wheel whether a steering wheel grip status is a one-handed grip status or a two-handed grip status, and a grip completion judging step judging based on the steering wheel grip status when gripping the steering wheel is requested whether the status is a grip completion status where the steering wheel has finished being gripped. The grip completion judging step changes whether to judge the status is a grip completion status if at least a one-handed grip status or to judge whether the status is a grip completion status only if a two-handed grip status in accordance with the driving scene.

Further, a nontransitory recording medium provided with a computer program according to one aspect of the present disclosure makes a computer request a driver grip a steering wheel at the time of a predetermined driving scene, judge based on input information from the driver on the steering wheel whether a steering wheel grip status is a one-handed grip status or a two-handed grip status, judge based on the steering wheel grip status when gripping the steering wheel is requested whether the status is a grip completion status where the steering wheel has finished being gripped, and change whether to judge the status is a grip completion status if at least a one-handed grip status or to judge whether the status is a grip completion status only if a two-handed grip status in accordance with the driving scene.

According to these aspects of the present disclosure, it is possible to change whether to judge grip completion by a one-handed grip status or judge grip completion by a two-handed grip status in accordance with the driving scene, so it is possible to not unnecessarily request the driver grip the steering wheel by both hands and possible to request the steering wheel be gripped by both hands when really necessary. For this reason, it is possible to secure safety of automated driving without detracting from the convenience of automated driving.

DESCRIPTION OF EMBODIMENTS

Figure 1:
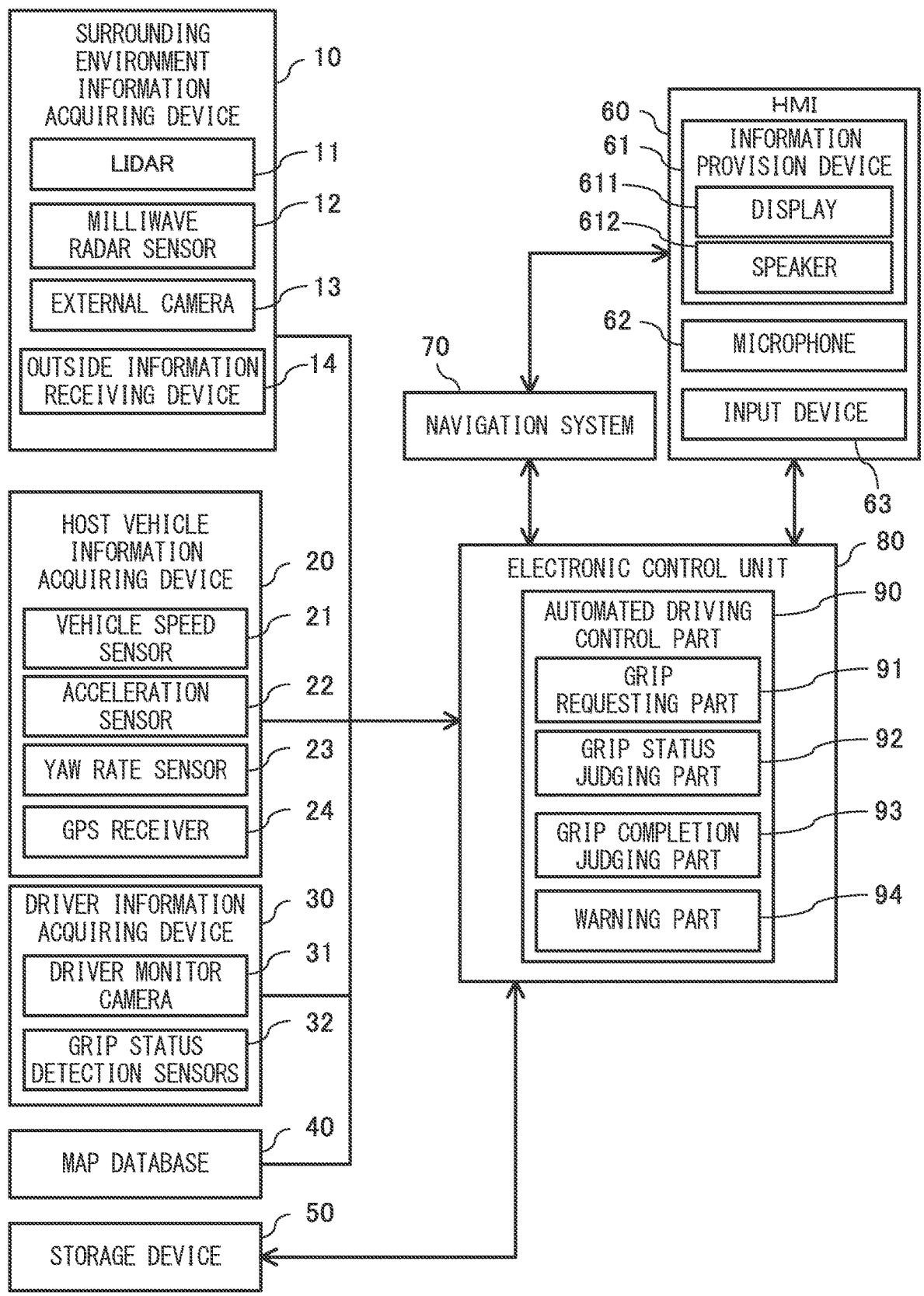
FIG. 1 is a schematic view of the configuration of an automated driving system for a vehicle according to one embodiment of the present disclosure.

Below, referring to the drawings, embodiments of the present invention will be explained in detail. Note that, in the following explanation, similar component elements will be assigned the same reference notations.

Figure 2:
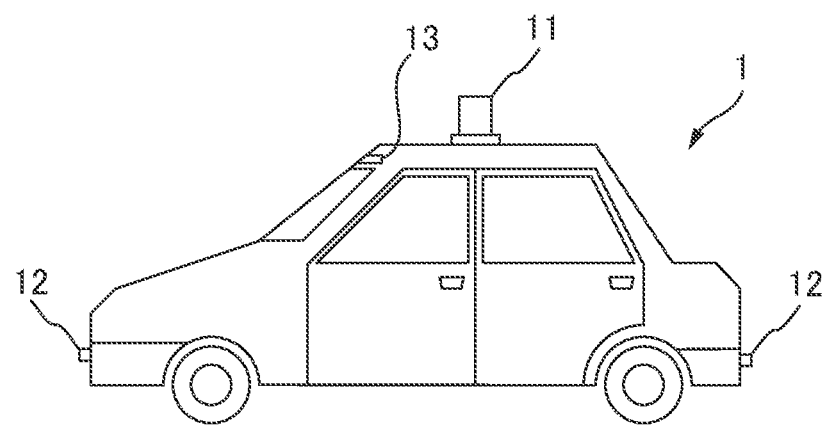
FIG. 2 is a schematic view of the appearance of a host vehicle mounting an automated driving system according to an embodiment of the present disclosure.
Figure 3:
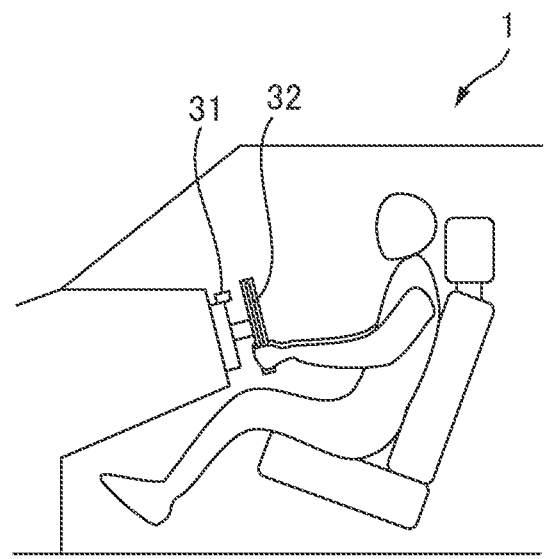
FIG. 3 is a schematic view of the inside of a host vehicle mounting an automated driving system according to an embodiment of the present disclosure.

FIG. 1 is a schematic view of the configuration of an automated driving system 100 of a vehicle according to one embodiment of the present invention. FIG. 2 is a schematic view of the appearance of a host vehicle 1 mounting the automated driving system 100 according to the present embodiment. FIG. 3 is a schematic view of the inside of the host vehicle 1 mounting the automated driving system 100 according to the present embodiment.

As shown in FIG. 1, the automated driving system 100 according to the present embodiment is provided with a surrounding environment information acquiring device 10, a host vehicle information acquiring device 20, a driver information acquiring device 30, a map database 40, a storage device 50, a human-machine interface (below, referred to as an "HMI") 60, a navigation system 70, and an electronic control unit 80.

The surrounding environment information acquiring device 10 is a device for acquiring information relating to obstacles in the surroundings of the host vehicle (for example, buildings, moving vehicles such as vehicles in front of it and in back of it on the road and oncoming vehicles, stopped vehicles, the curb, fallen objects, pedestrians, etc.) and the weather and other such surrounding environmental statuses of the host vehicle 1 (below, referred to as the "surrounding environment information"). As shown in FIG. 1 to FIG. 3, the surrounding environment information acquiring device 10 according to the present embodiment is provided with a LIDAR (laser imaging detection and ranging) 11, milliwave radar sensors 12, external camera 13, and outside information receiving device 14.

The LIDAR 11 uses laser beams to detect the road and obstacles in the host vehicle surroundings. As shown in FIG. 2, in the present embodiment, the LIDAR 11 is, for example, attached to the roof of the host vehicle 1. The LIDAR 11 successively fires laser beams toward the overall surroundings of the host vehicle 1 and measures the distances to the road and host vehicle surroundings from the reflected light. Further, the LIDAR 11 uses the results of measurement as the basis to generate 3D images of the road and obstacles in the overall surroundings of the host vehicle 1 and sends information of the generated 3D images to the electronic control unit 80.

Note that, the locations of attachment of the LIDAR 11 are not particularly limited so long as locations where the information necessary for generating a three-dimensional image can be acquired. For example, they may also be attached to the grilles or to the insides of the headlights or brake lights and other such lights of the host vehicle 1 or may be attached to parts of the body (frame) of the host vehicle 1.

The milliwave radar sensors 12 utilize electromagnetic waves to detect obstacles in the host vehicle surroundings at a farther distance than the LIDAR device 11. As shown in FIG. 2, in the present embodiment, the milliwave radar sensors 12, for example, are attached to the front bumper and rear bumper of the host vehicle 1. The milliwave radar sensors 12 emit electromagnetic waves to the surroundings of the host vehicle 1 (in the present embodiment, the front, rear, and sides of the host vehicle 1) and use the reflected waves to measure the distances to obstacles in the host vehicle surroundings and the relative speed with the obstacles. Further, the milliwave radar sensors 12 send the results of measurement as host vehicle surrounding information to the electronic control unit 80.

Note that, the locations of attachment of the milliwave radar sensors 12 are not particularly limited so long as locations where the necessary host vehicle surrounding information can be acquired. For example, they may also be attached to the grilles or to the insides of the headlights or brake lights and other such lights of the host vehicle 1 or may be attached to parts of the body (frame) of the host vehicle 1.

The external camera 13 captures an image of the area in front of the host vehicle 1. As shown in FIG. 2, in the present embodiment, the external camera 13 is, for example, attached to the center part of the front of the roof of the host vehicle 1. The external camera 13 processes the captured image of the area in front of the host vehicle to detect information on obstacles in front of the host vehicle, the width of the lane of the road driven on and the road shape, road signs, white lines, the state of traffic lights, and other road information in the area in front of the host vehicle, the yaw angle (relative direction of vehicle with respect to lane driven on), the offset position of the vehicle from the center of the lane driven on, and other such driving information of the host vehicle 1, rain or snow or fog and other such weather information of the host vehicle surroundings, etc. Further, the external camera 13 sends the detected image information to the electronic control unit 80.

Note that, the location of attachment of the external camera 13 is not particularly limited so long as a location able to capture an image of the area in front of the host vehicle 1. For example, the camera may also be attached to the top of the center part of the back surface of the front glass of the host vehicle.

The outside information receiving device 14, for example, receives congestion information, weather information (rain, snow, fog, wind speed, and other information), road work information, and other outside information sent from a traffic information communication system center or other outside communication center. The outside information receiving device 14 sends the received outside information to the electronic control unit 80.

The host vehicle information acquiring device 20 is a device for acquiring a speed or acceleration, posture, and current position of the host vehicle 1 and other such information relating to the conditions of the host vehicle 1 (below, referred to as "host vehicle information"). As shown in FIG. 1, the host vehicle information acquiring device 20 according to the present embodiment is provided with a vehicle speed sensor 21, acceleration sensor 22, yaw rate sensor 23, and GPS receiver 24.

The vehicle speed sensor 21 is a sensor for detecting the speed of the host vehicle 1. The vehicle speed sensor 21 sends the detected vehicle speed information of the host vehicle 1 to the electronic control unit 80.

The acceleration sensor 22 is a sensor for detecting the acceleration of the host vehicle 1 at the time of accelerating or the time of braking. The acceleration sensor 22 sends the detected acceleration information of the host vehicle 1 to the electronic control unit 80.

The yaw rate sensor 23 is a sensor for detecting the posture of the host vehicle 1, more specifically detects the speed of change of the yaw angle at the time the host vehicle 1 turns, that is, the rotational angular speed (yaw rate) about the vertical axis of the host vehicle 1. The yaw rate sensor 23 sends the detected posture information of the host vehicle 1 to the electronic control unit 80.

The GPS receiver 24 receives signals from three or more GPS satellites to identify the longitude and latitude of the host vehicle 1 and detect the current position of the host vehicle 1. The GPS receiver 24 sends the detected current position information of the host vehicle 1 to the electronic control unit 80.

The driver information acquiring device 30 is a device for acquiring information relating to the condition of the driver of the host vehicle 1 (below, referred to as the "driver information"). As shown in FIG. 1 and FIG. 3, the driver information acquiring device 30 according to the present embodiment is provided with a driver monitor camera 31 and grip status detection sensors 32.

The driver monitor camera 31 is attached to the top surface of the steering wheel column cover and captures an image of the appearance of the driver. The driver monitor camera 31 processes the captured image of the driver to detect information on the driver (direction of face of driver, degree of opening of eyes, etc.) and information on the appearance of the driver such as his posture. Further, the driver monitor camera 31 sends the detected information of the appearance of the driver to the electronic control unit 80.

The grip status detection sensors 32 are sensors for detecting input information from the driver on the steering wheel. Specifically, the grip status detection sensors 32 detect, as input information from the driver on the steering wheel, if a steering wheel grip status of the driver is a non-grip status where the driver has taken his or her hands off from steering wheel, a one-handed grip status where the driver is gripping the steering wheel by one hand, or a two-handed grip status where the driver is gripping the steering wheel by both hands. The grip status detection sensors 32 send the detected input information from the driver on the steering wheel, that is, information on whether the steering wheel grip status of the driver is the non-grip status, is the one-handed grip status, or is the two-handed grip status, to the electronic control unit 80.

Note that, in the present embodiment, as the grip status detection sensors 32, capacitive touch sensors housed separated from each other at the left and right of the steering wheel are employed. Due to this, it is possible to detect the one-handed grip status or two-handed grip status.

The map database 40 is a database relating to map information. This map database 40 is for example stored in a hard disk drive (HDD) mounted in the vehicle. The map information includes positional information on the roads, information on the road shapes (for example, curves or straight stretches, curvature of curves, etc.), positional information on the intersections and turn-off points, information on the road types, etc.

The storage device 50 stores a road map designed for automated driving. The automated driving use road map is prepared by the electronic control unit 80 based on the 3D image generated by the LIDAR device 11 and constantly or periodically updated by the electronic control unit 80.

The HMI 60 is an interface for input and output of information between the driver or a vehicle passenger and the automated driving system 100. The HMI 60 according to the present embodiment is provided with an information provision device 61 for providing the driver with various types of information, a microphone 62 for recognizing the voice of the driver, and an input device 63 such as a touch panel, operation buttons, etc. for the driver to input to.

The information provision device 61 is provided with a display 611 for showing text information or image information and a speaker 612 for generating speech.

The navigation system 70 is an apparatus for guiding the host vehicle 1 to a destination set by the driver through the HMI 60. The navigation system 70 calculates the target route to the destination based on the current position information of the host vehicle 1 detected by the GPS receiver 24 and map information of the map database 40 and sends the information of the calculated target route as navigation information to the electronic control unit 80.

The electronic control unit 80 is a microcomputer comprised of components connected with each other by a bidirectional bus such as a central processing unit (CPU), read only memory (ROM), random access memory (RAM), input port, and output port. That is, the electronic control unit 80 has a semiconductor memory or other storage medium and stores in that storage medium various computer programs or data etc. used for controlling the host vehicle 1. Further, the CPU (processor) of the electronic control unit 80 runs various computer programs stored in a recording medium and comprehensively controls the various control parts mounted in the host vehicle 1.

For example, in the present embodiment, the electronic control unit 80 is provided with an automated driving control part 90 automatically performing driving operations relating to acceleration, steering, and braking to autonomously drive the host vehicle 1 when the driver switches the manual driving mode (mode where driver performs driving operations relating to acceleration, steering, and braking) to the automated driving mode.

The automated driving control part 90 prepares a driving plan setting the target driving lines and target vehicle speed etc. when the host vehicle 1 will be driven on a road ahead of the host vehicle based on the obstacle information ahead of the host vehicle (information on preceding vehicles, fallen objects, etc.), the lane width of the roads and road shapes, number of driving lanes and other such road information ahead of the host vehicle, vehicle speed information of the host vehicle 1, etc. The driving plan is for example expressed as a set of target positions of the host vehicle 1 in different times from the current time to a predetermined time ahead, Further, the automated driving control part 90 controls the various control parts required for driving operations relating to acceleration, steering, and braking and automatically performs driving operations of the host vehicle 1 in accordance with the prepared driving plan based on the surrounding environment information, the host vehicle information, and, in accordance with need, the driver information and other various information.

In this regard, during automated driving after switching to the automated driving mode, there are driving scenes where it is desirable to request the driver grip the steering wheel so as to secure safety during automated driving.

As such driving scenes, for example, there are the times of merging into a main lane or when there is a possibility of approaching a preceding vehicle or other scenes where it is necessary for a driver to be able to immediately perform a driving operation relating to steering (steering wheel operation) if something happens may be mentioned. In this way, if requesting gripping of the steering wheel since there is a possibility of getting a driving operation relating to steering to be performed in accordance with need, it is desirable to get the driver to grip the steering wheel by both hands.

On the other hand, as a driving scene where it is desirable to request gripping of the steering wheel, in addition to the driving scenes explained above, for example, a scene where the driver has to be able to immediately perform a driving operation relating to braking so as to deal with deterioration of the road surface conditions due to rain, accumulated snow, freezing, etc. (increase of braking distance), a scene where it is desired to get the driver to grip the steering wheel since the condition of the driver cannot be grasped due to glare or a problem in the driver monitor camera, etc. may be mentioned. In such a scene, it is possible to secure safety during automated driving even if the driver is not necessarily gripping the steering wheel by both hands so long as he or she is gripping it by one hand. Therefore, in such a driving scene, requesting the driver grip the steering wheel by both hands is liable to detract from the convenience of automated driving.

Therefore, in the present embodiment, the automated driving control part 90 is configured by provision of a grip requesting part 91 requesting the driver grip the steering wheel at the time of a predetermined driving scene, a grip status judging part 92 judging based on the input information from the driver on the steering wheel whether the steering wheel grip status is a one-handed grip status or two-handed grip status, a grip completion judging part 93 judging based on the steering wheel grip status if the status is a grip completion status where the driver has finished gripping the steering wheel when gripping the steering wheel is requested, and a warning part 94 issuing a predetermined warning to the driver through the information provision device 61.

Further, in the grip completion judging part 93 judging whether the status is the grip completion status, whether to judge the grip completion status if at least the one-handed grip status or whether to judge the grip completion status only if the two-handed grip status is changed according to the driving scene.

By changing whether to judge grip completion by the one-handed grip status or whether to judge grip completion by the two-handed grip status according to the driving scene, it is possible to keep from unnecessarily requesting the driver to grip the steering wheel by both hands and to request that the driver grip the steering wheel by both hands when really necessary. For this reason, it is possible to secure safety of automated driving without detracting from the convenience of automated driving. Below, automated driving control according to the present embodiment will be explained.

Figure 4:
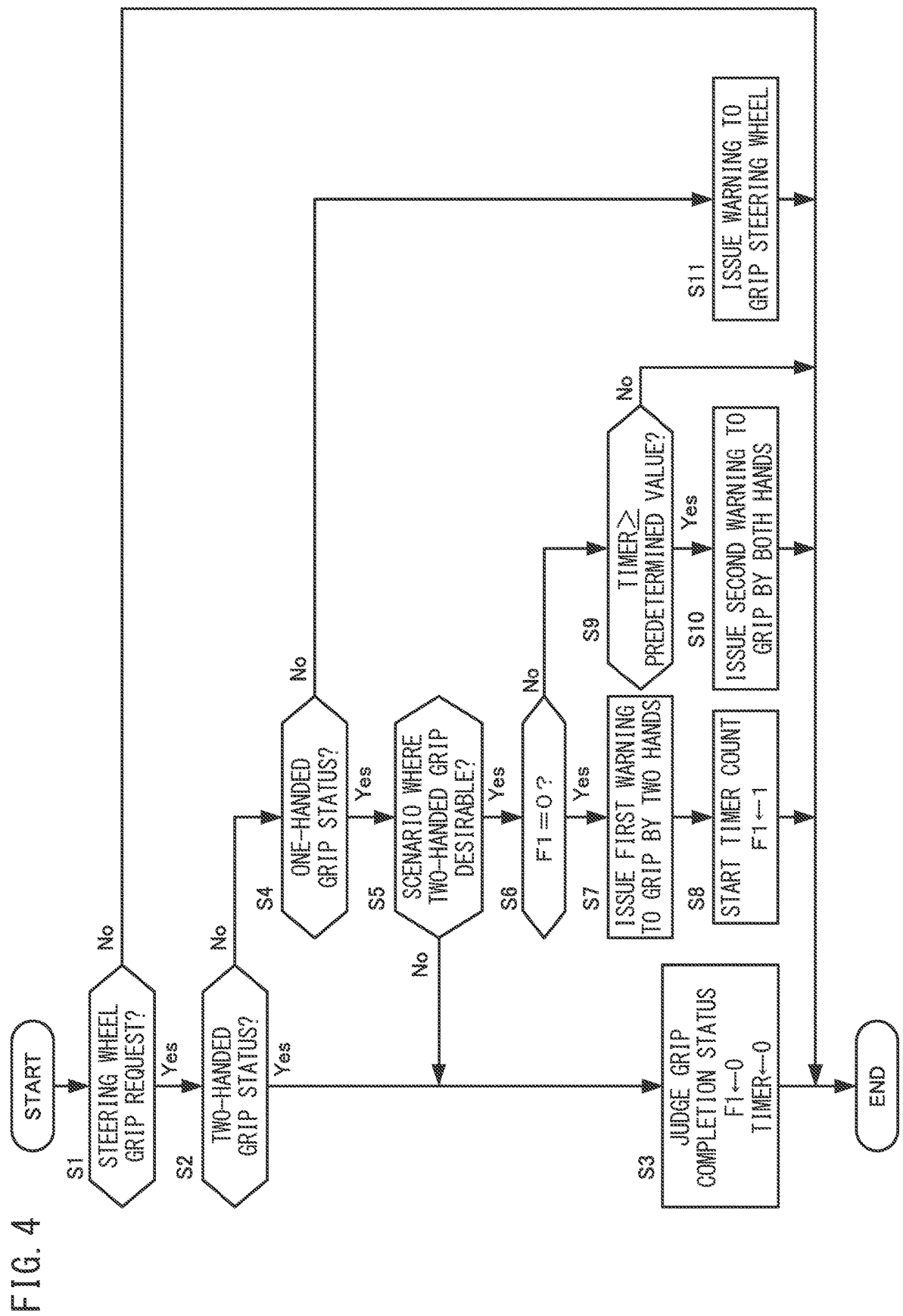
FIG. 4 is a flow chart explaining the automated driving control according to an embodiment of the present disclosure.

FIG. 4 is a flow chart explaining the automated driving control according to the present disclosure which the electronic control unit 80 performs. The electronic control unit 80 repeatedly performs the present routine by a predetermined processing period during the automated driving mode.

At step S1, the electronic control unit 80 judges if it is necessary to request the driver grip the steering wheel. In the present embodiment, the electronic control unit 80 judges if the scene is a predetermined driving scene.

As the predetermined driving scene, for example, scenes such as the following (1) to (4) may be mentioned:

(1) Scene requesting driver prepare for driving operation relating to steering such as at the time of merging into a lane or when there is a possibility of approaching a preceding vehicle, (2) Scene requiring enhancement of the ability of driver to avoid danger (ability to avoid danger etc. by the driver himself or herself performing the driving operation) by making him or her more conscious of driving such as after it is judged that the driver was asleep at the wheel or was distracted in driving for a long period of time, (3) Scene requesting driver prepare for driving operation relating to braking (that is, prepare for depressing brake pedal) such as when there is a possibility of the braking distance increasing due to a change in the road surface conditions due to rain, accumulated snow, freezing, etc., and (4) Scene where it is not possible to determine status of driver due to glare or a problem in the driver monitor camera 31 etc.

If the current driving scene corresponds to any of the scenes of the above (1) to (4), the electronic control unit 80 judges that it is necessary to request the driver grip the steering wheel then proceeds to the processing of step S2. On the other hand, if the current driving scene does not correspond to any of the scenes of the above (1) to (4), the electronic control unit 80 judges that it is not necessary to request the driver grip the steering wheel then ends the current processing.

At step S2, the electronic control unit 80 judges based on the input information from the driver on the steering wheel detected by the grip status detection sensors 32 whether the steering wheel grip status is a two-handed grip status. If the steering wheel grip status is the two-handed grip status, the electronic control unit 80 proceeds to the processing of step S3. On the other hand, if the steering wheel grip status is not a two-handed grip status (that is, if it is a non-grip status or one-handed grip status), the electronic control unit 80 proceeds to the processing of step S4.

At step S3, the electronic control unit 80 judges the status is a grip completion status where the steering wheel has finished being gripped. At this time, it is possible to issue a warning prompting the driver to continue gripping the steering wheel. The warning method is not particularly limited. For example, it may be performed by voice or text and may be performed by a visual method such as making an icon flash or animating it. Further, if the later explained first warning flag F1 had been set to 1, the electronic control unit 80 returns the flag F1 to the initial value of 0 and returns the later explained timer to the initial value of 0.

At step S4, the electronic control unit 80 judges based on input information from the driver on the steering wheel detected by the grip status detection sensors 32 whether the steering wheel grip status is a one-handed grip status. If the steering wheel grip status is a one-handed grip status, the electronic control unit 80 proceeds to the processing of step S5. On the other hand, if the steering wheel grip status is not a one-handed grip status (that is, if non-grip status), the electronic control unit 80 proceeds to the processing of step S11.

At step S5, the electronic control unit 80 judges if the current driving scene is a scene where it is desirable to grip the steering wheel by both hands. In the present embodiment, if the current driving scene is a scene of the above (1) or (2), the electronic control unit 80 judges that it is a scene where it is desirable to grip the steering wheel by both hands and proceeds to the processing of step S6. On the other hand, if the current driving scene is a scene of the above (3) or (4), the electronic control unit 80 judges that it is a scene where safety of the automated driving can be secured if gripping by one hand and proceeds to the processing of step S3.

At step S6, the electronic control unit 80 judges whether the first warning flag F1 has been set to 0. The first warning flag F1 is a flag which is set to 1 when an initial warning (later explained first warning) is issued for making the driver grip the steering wheel by both hands since he or she is gripping the steel sheet by one hand in a scene where it is desirable to grip the steering wheel by both hands. The initial value is set to 0. The electronic control unit 80 proceeds to the processing of step S7 if the first warning flag F1 has been set to 0. On the other hand, the electronic control unit 80 proceeds to the processing of step S9 if the first warning flag F1 has been set to 1.

At step S7, the electronic control unit 80 issues the first warning to the driver through the information provision device 61 so as to get him or her to grip the steering wheel by both hands. The method of the first warning is not particularly limited, but in the present embodiment the electronic control unit 80 displays suitable text information or a graphic to get the driver to grip the steering wheel by both hands (for example, an icon, animation, or other visual information) on the display 611 and informs the driver by voice information similar to the text information by a speaker 612.

At step S8, the electronic control unit 80 starts the count of the timer for counting the elapsed time from when issuing the first warning and sets the first warning flag F1 to 1.

At step S9, the electronic control unit 80 judges if the timer has become greater than or equal to or equal to a predetermined value, that is, if the elapsed time from when issuing the first warning becomes greater than or equal to a predetermined time. The electronic control unit 80 proceeds to the processing of step S10 if the elapsed time from when issuing the first warning becomes a predetermined time or more. On the other hand, the electronic control unit 80 ends the current processing if the elapsed time from when issuing the first warning is less than a predetermined time.

At step S10, the electronic control unit 80 issues a second warning stronger in degree of warning than the first warning to the driver through the information provision device 61 so as to get him or her to grip the steering wheel by both hands. The method of the second warning is also not particularly limited, but in the present embodiment, the electronic control unit 80 displays suitable text information or a graphic to get the driver to grip the steering wheel by both hands (for example, an icon, animation, or other visual information) on the display 611 and informs the driver by voice information similar to the text information by a speaker 612.

At step S11, the electronic control unit 80 issues a suitable warning to the driver so as to grip the steering wheel through the information provision device 61. The method of the warning is also not particularly limited, but in the present embodiment, the electronic control unit 80 displays suitable text information to get the driver to grip the steering wheel by both hands (or one hand) on the display 611 and informs the driver by voice information similar to the text information by the speaker 612.

The electronic control unit 80 (control device) of the host vehicle 1 according to the present embodiment explained above is provided with an automated driving control part 90 performing automated driving automatically performing driving operations of the host vehicle 1. The automated driving control part 90 is provided with a grip requesting part 91 requesting the driver grip the steering wheel when the scene becomes a predetermined driving scene, a grip status judging part 92 judging based on the input information from the driver on the steering wheel whether the steering wheel grip status is a one-handed grip status or is a two-handed grip status, and a grip completion judging part 93 judging when gripping the steering wheel is requested whether the status is a grip completion status where the driver has finished gripping the steering wheel based on the steering wheel grip status.

Further, the grip completion judging part 93 is configured so as to change whether to judge the status is a grip completion status if at least a one-handed grip status or judge whether the status is a grip completion status only if a two-handed grip status in accordance with the driving scene. Specifically, the grip completion judging part 93 is configured so that if the driving scene requesting the driver grip the steering wheel was a scene requesting the driver to prepare for a driving operation relating to steering or a scene requiring enhancement of the ability of the driver to avoid danger, if judges a grip completion status only if the steering wheel grip status is a two-handed grip status and is configured so that if the driving scene requesting the driver grip the steering wheel was a scene requesting the driver to prepare for a driving operation relating to braking or a scene where the condition of the driver cannot be grasped, it judges a grip completion status if the steering wheel grip status is at least a one-handed grip status.

By changing whether to judge grip completion by the one-handed grip status or whether to judge grip completion by the two-handed grip status according to the driving scene in this way, it is possible to not unnecessarily request the driver grip the steering wheel by both hands and possible to request the steering wheel be gripped by both hands when really necessary. For this reason, it is possible to secure safety of automated driving without detracting from the convenience of automated driving.

Further, the host vehicle 1 according to the present embodiment is provided with an information provision device 61 for providing the driver with information. The automated driving control part 90 of the electronic control unit 80 is further provided with a warning part 94 for issuing a first warning through the information provision device 61 to the driver to grip the steering wheel with both hands when the steering wheel grip status of the driver was a one-handed grip status in the case where the steering wheel grip status for judging a grip completion status is made a two-handed grip status. The warning part 94 is configured to issue a second warning stronger in warning degree than the first warning through the information provision device 61 when the steering wheel grip status was a one-handed grip status even after the elapse of a predetermined time from when issuing the first warning.

Due to this, when the driver has not gripped the steering wheel by both hands in a scene where gripping the steering wheel by both hands is desirable, it is possible to issue various levels of warnings to the driver to grip the steering wheel by both hands. For this reason, it is possible to prevent occurrence of a situation where a strong warning is suddenly given to the driver causing anxiety or discomfort to be felt.

Above, an embodiment of the present disclosure was explained but the present embodiments only illustrate some of the applications of the present disclosure and do not specifically restrict the technical scope of the present disclosure.

For example, in the above embodiment, if the current driving scene is the scene of the above (2), it was judged that the driver had finished gripping by the two-handed grip status. This is based on the experimental results that after it is judged that the driver had been asleep at the wheel or had been driving distracted for a long period of time etc., the ability of driver to avoid danger (ability to avoid danger etc. by the driver himself or herself performing the driving operation) tends to temporarily fall and that by making him or her grip the steering wheel by two hands, the ability of the driver to avoid danger can be enhanced. However, in the scene of the above (2), even if having gripped the steering wheel by one hand, it is guessed that the ability of the driver to avoid danger will be enhanced. Therefore, if the current driving scene is the scene of the above (2), it may be judged that gripping has been completed by the one-handed grip status.

Further, if viewing the present embodiment from another viewpoint, the processing performed in the electronic control unit 80 can be said to be a control method of an automated driven vehicle comprising a grip request step requesting a driver grip a steering wheel at the time of a predetermined driving scene, a grip status judging step judging based on input information from the driver on the steering wheel whether a steering wheel grip status is a one-handed grip status or a two-handed grip status, and a grip completion judging step judging based on the steering wheel grip status when gripping the steering wheel is requested whether the status is a grip completion status where the steering wheel has finished being gripped, the grip completion judging step changing whether to judge the status is a grip completion status whether at least a one-handed grip status or to judge whether the status is a grip completion status only if a two-handed grip status in accordance with the driving scene.

Further, if viewing the present embodiment from another viewpoint, the computer program performed in the electronic control unit 80 can be said to be a computer program making a computer request a driver grip a steering wheel at the time of a predetermined driving scene, judge based on input information from the driver on the steering wheel whether a steering wheel grip status is a one-handed grip status or a two-handed grip status, judge based on the steering wheel grip status when gripping the steering wheel is requested whether the status is a grip completion status where the steering wheel has finished being gripped, and change whether to judge the status is a grip completion status if at least a one-handed grip status or to judge whether the status is a grip completion status only if a two-handed grip status in accordance with the driving scene. Further, in the present embodiment, the computer program is stored in a semiconductor memory or other nontransitory recording medium.

The invention claimed is:

1. A control device for a vehicle, wherein
the control device comprises a processor being configured to:
perform automated driving for automatically performing a driving operation of the vehicle;
request that a driver grip a steering wheel in response to determining that a current driving scene, determined based at least on information collected by sensors in the vehicle, corresponds to a predetermined driving scene;
after the request has been made:
judge based on input information from the driver on the steering wheel whether a steering wheel grip status is a one-handed grip status or a two-handed grip status;
in response to judging that the steering wheel grip status is the two-handed grip status, automatically judge that the steering wheel grip status is a grip completion status where the gripping of the steering wheel is considered finished;
in response to judging that the steering wheel grip status is the one-handed grip status, further judge at a time point later than when the request was made, whether the predetermined driving scene corresponds to a first type where the one-handed grip status would be sufficient for the grip completion status or corresponds to a second type where the two-hand grip status would be required for the grip completion status;
in response to judging that the predetermined driving scene corresponds to the first type, judge that the steering wheel grip status is the grip completion status; and
in response to judging that the predetermined driving scene corresponds to the second type, issue a warning.

2. The control device for the vehicle according to claim 1, wherein
the processor is configured so that, when the predetermined driving scene is a scene requesting the driver to prepare for a driving operation relating to steering, including a case of merging into a lane or approaching a preceding vehicle, the processor judges that the predetermined driving scene corresponds to the second type and the two-handed grip status is required for the grip completion status.

3. The control device for the vehicle according to claim 1, wherein
the processor is configured so that, when the predetermined driving scene is a scene requiring an ability of the driver to avoid danger to be enhanced, including a case in which the driver was asleep at the steering wheel or was distracted from driving for a preset period of time, the processor judges that the predetermined driving scene corresponds to the second type and the two-handed grip status is required for the grip completion status.

4. The control device of the vehicle according to claim 1, wherein
the processor is configured so that, when the predetermined driving scene is a scene requesting the driver to prepare for a driving operation relating to braking, including a case in which a braking distance is expected to increase due to a change in a road surface condition due to weather, the processor judges that the predetermined driving scene corresponds to the first type and the one-handed grip status is sufficient for the grip completion status.

5. The control device for the vehicle according to claim 1, wherein
the processor is configured so that, when the predetermined driving scene is a scene where it is not possible to determine a condition of the driver, including a case in which a status of the driver cannot be determined due to glare or a problem in a driver monitor camera in the vehicle, the processor judges that the predetermined driving scene corresponds to the first type the one-handed grip status is sufficient for the grip completion status.

6. The control device for the vehicle according to claim 1, wherein
the processor is further configured to:
issue a first warning to the driver so as to grip the steering wheel by both hands through an information provision device for providing information to the driver when the steering wheel grip status of the driver is the one-handed grip status in the case where the grip completion status requires the steering wheel grip status to be the two-handed grip status; and
issue a second warning stronger in warning degree than the first warning through the information provision device when the steering wheel grip status remains to be the one-handed grip status even after a predetermined time has elapsed from when the first warning issued.

7. A control method for an automated driven vehicle, the control method comprising:
a grip request step for requesting a driver to grip a steering wheel in response to determining that a current driving scene, determined based at least on information collected by sensors in the vehicle, corresponds to a predetermined driving scene;
after the grip request step:
a grip status judging step for judging based on input information from the driver on the steering wheel whether a steering wheel grip status is a one-handed grip status or a two-handed grip status; and
a grip completion judging step for:
in response to judging that the steering wheel grip status is the two-handed grip status, automatically judging that the steering wheel grip status is a grip completion status where the gripping of the steering wheel is considered finished; and
in response to judging that the steering wheel grip status is the one-handed grip status, further judging at a time point later than when the grip request step was performed, whether the predetermined driving scene corresponds to a first type where the one-handed grip status would be sufficient for the grip completion status or corresponds to a second type where the two-hand grip status would be required for the grip completion status;

in response to judging that the predetermined driving scene corresponds to the first type, judging that the steering wheel grip status is the grip completion status; and in response to judging that the predetermined driving scene corresponds to the second type, issuing a warning.

8. A nontransitory recording medium provided with a computer program which, when executed, cause a computer to:

request a driver to grip a steering wheel in response to determining that a current driving scene, determined based at least on information collected by sensors in the vehicle, corresponds to a predetermined driving scene;

after the request has been made:

judge based on input information from the driver on the steering wheel whether a steering wheel grip status is a one-handed grip status or a two-handed grip status;

in response to judging that the steering wheel grip status is the two-handed grip status, automatically judge that the steering wheel grip status is a grip completion status where the gripping of the steering wheel is considered finished; and in response to judging that the steering wheel grip status is the one-handed grip status, further judge at a time point later than when the request was made, whether the predetermined driving scene corresponds to a first type where the one-handed grip status would be sufficient for the grip completion status or corresponds to a second type where the two-hand grip status would be required for the grip completion status in response to judging that the predetermined driving scene corresponds to the first type, judge that the steering wheel grip status is the grip completion status; and in response to judging that the predetermined driving scene corresponds to the second type, issue a warning.

9. The control device for the vehicle according to claim 1, wherein the control device continues to perform the automated driving after judging that the steering wheel grip status is the grip completion status.

\* \* \* \* \*